US009142215B2

(12) United States Patent
Rosner et al.

(10) Patent No.: US 9,142,215 B2
(45) Date of Patent: Sep. 22, 2015

(54) POWER-EFFICIENT VOICE ACTIVATION (75) Inventors: Stephan Rosner, Campbell, CA (US); Chen Liu, Woodridge, IL (US); Jens Olson, Saratoga, CA (US)

(73) Assignee: Cypress Semiconductor Corporation, San Jose, CA (US)

( * ) Notice: Subject to any disclaimer, the term of this patent is extended or adjusted under 35 U.S.C. 154(b) by 238 days.

(21) Appl. No.: 13/524,584

(22) Filed: Jun. 15, 2012

(65) Prior Publication Data
US 2013/0339028 A1 Dec. 19, 2013

(51) Int. Cl.
*G10L 15/26* (2006.01)
*G10L 15/22* (2006.01)
*G10L 25/78* (2013.01)

(52) U.S. Cl.
CPC ............. *G10L 15/222* (2013.01); *G10L 15/22* (2013.01); *G10L 15/265* (2013.01); *G10L 25/78* (2013.01)

(58) Field of Classification Search
CPC ........ G10L 15/265; G10L 15/22; G10L 25/78
USPC .................. 704/231–257, 270–278
See application file for complete search history.

(56) References Cited

U.S. PATENT DOCUMENTS

| 5,983,186 A * | 11/1999 | Miyazawa et al. ............ 704/275 |
| 6,070,140 A * | 5/2000 | Tran ............................... 704/275 |
| 6,718,307 B1 * | 4/2004 | Buil et al. ....................... 704/270 |
| 7,418,392 B1 * | 8/2008 | Mozer et al. ................... 704/275 |
| 8,315,865 B2 * | 11/2012 | Kuris ............................. 704/233 |
| 2002/0165711 A1 * | 11/2002 | Boland ........................... 704/231 |
| 2003/0171932 A1 * | 9/2003 | Juang et al. ................... 704/276 |
| 2004/0128137 A1 | 7/2004 | Bush et al. |
| 2005/0245203 A1 * | 11/2005 | Vance ............................. 455/79 |
| 2005/0251386 A1 | 11/2005 | Kuris |
| 2007/0057798 A1 * | 3/2007 | Li et al. ....................... 340/573.1 |
| 2007/0281761 A1 * | 12/2007 | Kim ............................ 455/575.2 |
| 2012/0010890 A1 | 1/2012 | Koverzin |
| 2012/0215537 A1 * | 8/2012 | Igarashi ........................ 704/249 |

FOREIGN PATENT DOCUMENTS

JP 2008-009120 A 1/2008

OTHER PUBLICATIONS

International Search Report and Written Opinion of the International Searching Authority for International Application No. PCT/US2013/037800, mailed Aug. 21, 2013.
English language Abstract for document JP-2008-009120-A.

* cited by examiner

*Primary Examiner* — Samuel G Neway (57) ABSTRACT

A voice activation system is provided. The voice activation system includes a first stage configured to output a first activation signal if at least one energy characteristic of a received audio signal satisfies at least one threshold and a second stage configured to transition from a first state to a second state in response to the first activation signal and, when in the second state, to output a second activation signal if at least a portion of a profile of the audio signal substantially matches at least one predetermined profile.

16 Claims, 11 Drawing Sheets

FIG. 1
Conventional

POWER-EFFICIENT VOICE ACTIVATION

BACKGROUND

1. Field

Embodiments described herein generally refer to activation systems that are triggered based on received speech signals.

2. Background

Speech recognition systems often include a speech recognition engine that compares portions of a received signal to stored information to determine what a user has said to a device. Some of these speech recognition systems are designed to be able to respond to speech from a user at any time. Consequently, the speech recognition engine must remain active constantly so that it can monitor the ambient environment for speech.

Because speech is often not received for most of the time that the speech recognition engine is running, the speech recognition engine wastes power monitoring the ambient environment. Especially in wireless and mobile devices that are often battery-powered, this waste of power can be a substantial concern for system designers.

Some speech recognition engines save power by operating as multi-state devices. In a low power state, the speech recognition engine only uses enough power to detect certain specific words that have been previously designated as triggers. Once one of these words is detected, the speech recognition engine transitions to a fully-operational state in which it can recognize a full vocabulary of words. Although multi-state implementations provide some power savings, these savings are often modest because many of the components needed to recognize the full vocabulary of words are also needed to detect the specific words designated as triggers. Therefore, these components must remain active even in the low power state.

BRIEF SUMMARY

Embodiments described herein include methods, systems, and computer readable media for voice activation. In an embodiment, a voice activation system is provided. The voice activation system includes a first stage configured to output a first activation signal if at least one energy characteristic of a received audio signal satisfies at least one threshold and a second stage configured to transition from a first state to a second state in response to the first activation signal and, when in the second state, to output a second activation signal if at least a portion of a profile of the audio signal substantially matches at least one predetermined profile.

In another embodiment, a voice activation method is provided. The method includes comparing at least one energy characteristic of an audio signal to at least one threshold using a first stage of a voice activation system, transitioning a second stage of the voice activation system from a first state to a second stage if the audio signal satisfies the threshold, comparing at least a portion of a profile of the audio signal to at least one predetermined profile using the second stage of the voice activation system while the second stage of the voice activation system is in the second state, and transitioning a speech recognition engine of the voice activation system from a first state to a second state if the least a portion of a profile of the audio signal substantially matches the at least one predetermined profile.

In still another embodiment, a voice activation system is provided. The voice activation system includes a microphone configured to output an analog electrical signal corresponding to received sound waves, an analog-to-digital converter configured to convert the analog electrical signal to a digital signal, a first stage configured to output a first activation signal if at least one energy characteristic of the digital signal satisfies at least one threshold, a second stage configured to transition from a stand-by state to a fully-operational state in response to the first activation signal and, when in the fully-operational state, to output a second activation signal if at least a portion of a profile of the audio signal substantially matches at least one predetermined profile, and a speech recognition engine configured to transition from a first state to a second state based on the second activation signal.

These and other advantages and features will become readily apparent in view of the following detailed description of the invention. Note that the Summary and Abstract sections may set forth one or more, but not all exemplary embodiments of the present invention as contemplated by the inventor(s).

BRIEF DESCRIPTION OF THE DRAWINGS/FIGURES

The accompanying drawings, which are incorporated herein and form a part of the specification, illustrate the present invention and, together with the description, further serve to explain the principles of the invention and to enable a person skilled in the pertinent art to make and use the invention.

Embodiments of the present invention will now be described with reference to the accompanying drawings. In the drawings, like reference numbers indicate identical or functionally similar elements. Additionally, the left-most digit(s) of a reference number identifies the drawing in which the reference number first appears.

DETAILED DESCRIPTION

It is to be appreciated that the Detailed Description section, and not the Summary and Abstract sections, is intended to be used to interpret the claims. The Summary and Abstract sections may set forth one or more but not all exemplary embodiments of the present invention as contemplated by the inventor(s), and thus, are not intended to limit the present invention and the appended claims in any way.

Figure 1:
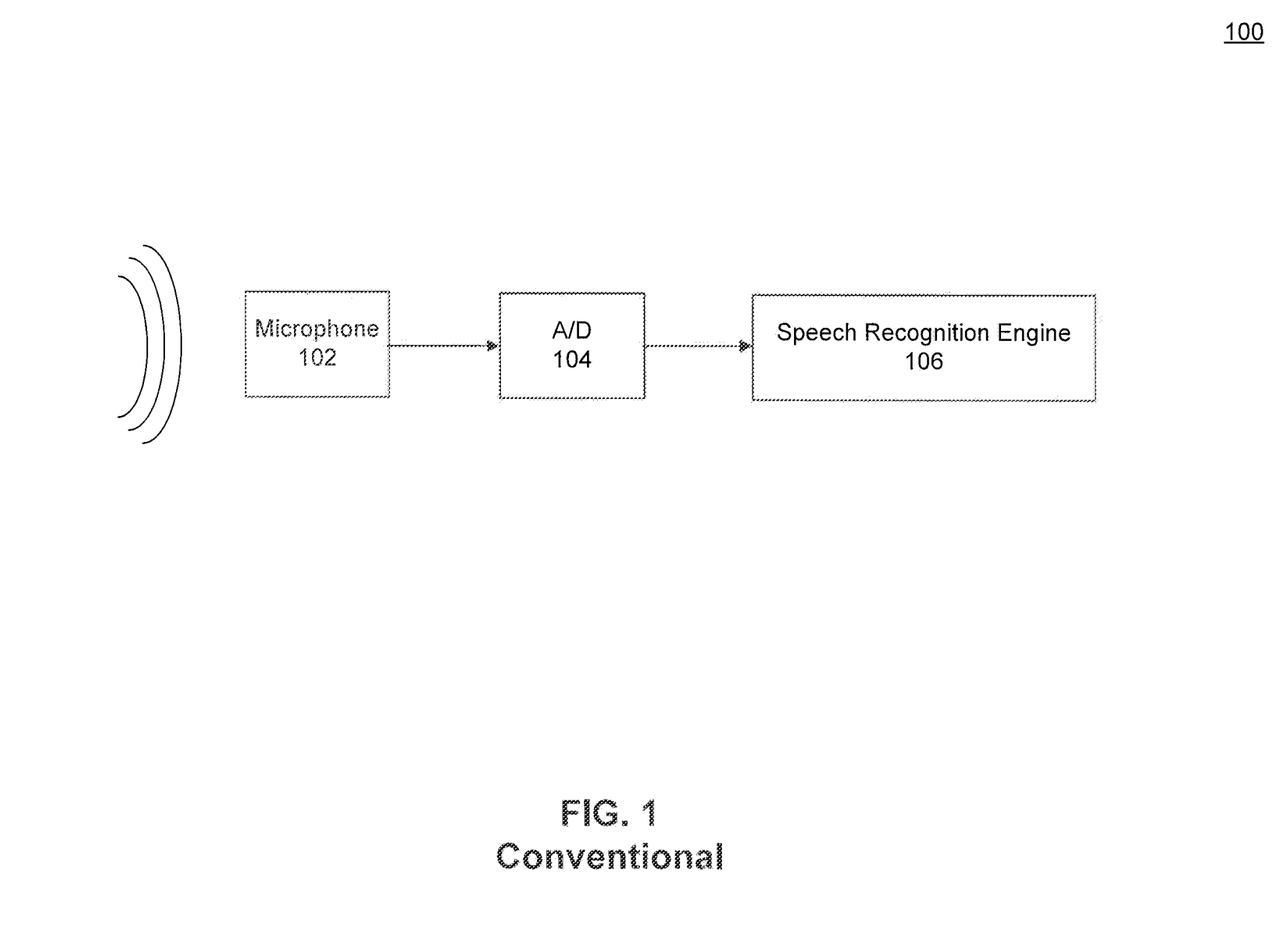
FIG. 1 is a block diagram of a conventional speech recognition system.

FIG. 1 is a block diagram of a conventional speech recognition system 100. Speech recognition system 100 includes a microphone 102, an analog-to-digital (A/D) converter 104, and a speech recognition engine 106. As shown in FIG. 1, microphone 102 receives sound waves and outputs a corresponding electrical signal to A/D converter 104. A/D converter 104 converts the received signal from an analog signal to a digital signal.

Speech recognition engine 106 receives the signal output by A/D converter 104. Speech recognition engine 106 is configured to recognize one or more words present in the received digital signal. For example, speech recognition engine 106 can load a library of acoustic models and a keyword or grammar spotting network to determine if one or more words are present in the received digital signal. For example, speech recognition engine 106 can compare portions of the digital signal to one or more acoustic models that represent specific word(s) to determine if certain words are present in the received signal. Speech recognition engine 106 can be implemented on a processor using software. Alternatively, speech recognition engine 106 can be implemented using a digital signal processor (DSP) or programmable hardware (e.g., a field programmable gate array (FPGA)).

In one implementation, each of microphone 102, A/D converter 104, and speech recognition engine 106 can be implemented as separate modules or integrated circuit (IC) device packages (e.g., coupled via a printed circuit board (PCB)). Alternatively, one or more of microphone 102, A/D converter 104, and speech recognition engine 106 can be implemented together in a single module or IC device package.

Although speech recognition engine system 100 can monitor the ambient environment and recognize words included in speech received by microphone 102 at any time, this operation typically requires that the speech recognition system 100 be at full power. In particular, all components of speech recognition system 100 must remain constantly running so that it can recognize and respond to speech signals received at any time. The power expended by speech recognition system 100 when no speech signals are received is wasted. This wasted power can be a substantial concern for system designers, especially in wireless or mobile systems that are often battery powered.

In an alternative implementation, speech recognition engine 106 can be a multi-state device. In this implementation, speech recognition engine 106 initially remains in a low power state in which it attempts to identify specific, predetermined words within the received audio signal. If these specific words are identified in the signal, speech recognition engine 106 transitions to a fully-operational state. In the fully-operational state, speech recognition engine 106 can recognize a fully vocabulary of words. Although this implementation reduces the power wasted by speech recognition system 100, the reduction is often modest because many of the power consuming components of speech recognition engine 106 remain powered even in the low power state.

A similar concept can be implemented in certain wireless or mobile devices. For example, such a device can initially remain in a low power state, but still keep a specific set of components active. These components are used to analyze a preamble and/or payload of a received packet to determine whether to transition the device to a fully-operational state in which all components are active. For example, these devices can be implemented according to the IEEE 802.11 standard. Although these devices reduce the amount of power that is wasted, they require a user to trigger the device using a wireless transmitter.

In embodiments described herein, a power-efficient voice activation system is provided. The voice activation system can include multiple stages. Each stage activates the next so that the most power consuming devices are active for the least amount of time. In an embodiment, a first stage can be an energy comparator that compares energy characteristic(s) of a received audio signal to one or more respective predetermined thresholds. If those predetermined thresholds are met or exceeded, the first stage can activate a second stage that analyzes at least a portion of a profile of the received signal to determine if it is a valid trigger for the voice activation system. In a further embodiment, only the energy detecting first stage is needed to monitor the ambient for potential speech signals, thereby saving power compared to conventional systems.

Figure 2:
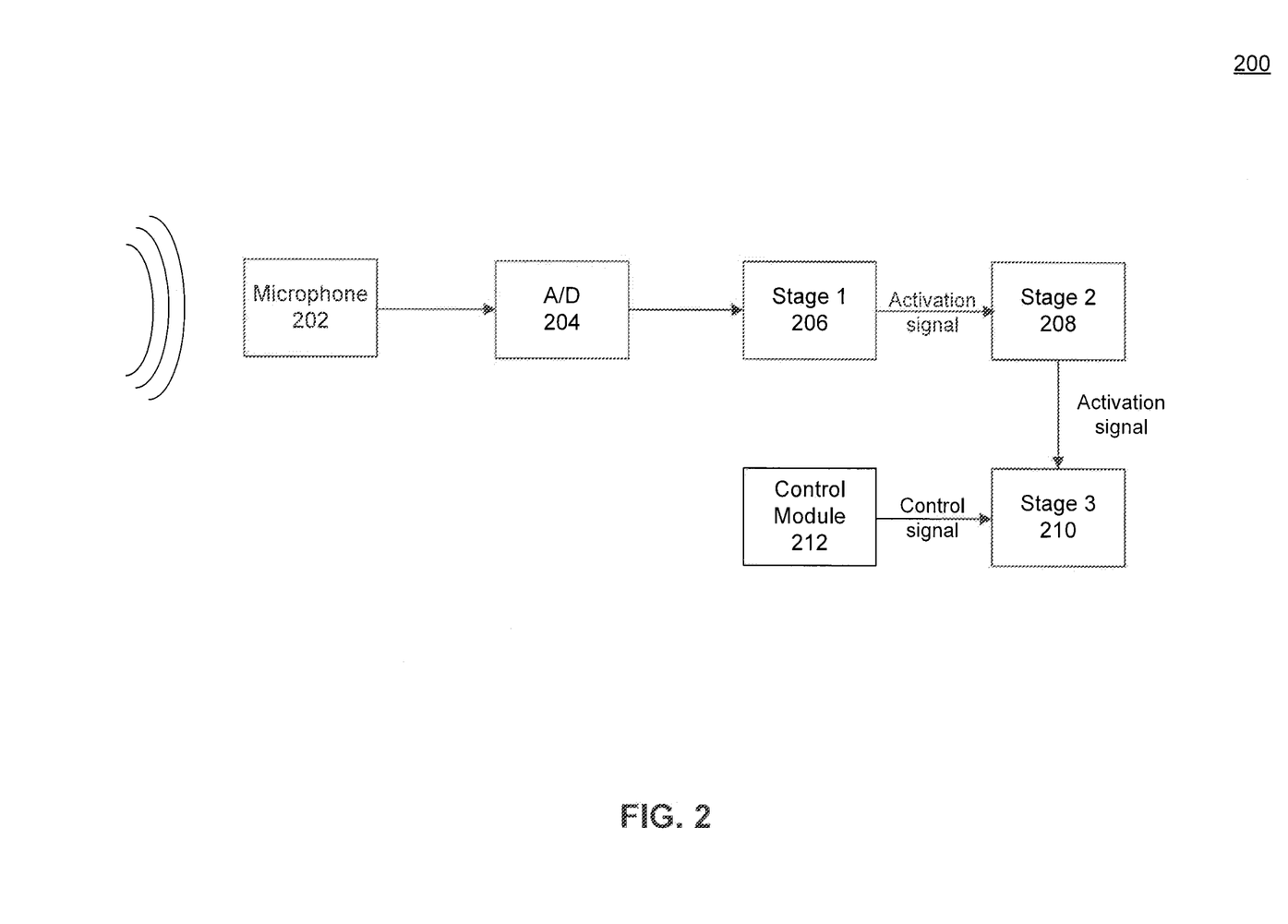
FIG. 2 is a block diagram of a voice activation system, according to an embodiment of the present invention.

FIG. 2 is a block diagram of a voice activation system 200, according to an embodiment of the present invention. Voice activation system 200 includes a microphone 202, an A/D converter 204, a first stage 206, a second stage 208, and a third stage 210, and a control module 212. Microphone 202 and A/D converter 204 can be substantially similar to microphone 102 and A/D 104 of speech recognition system 100, described with reference to FIG. 1.

First stage 206 receives a digital version of the received audio signal from A/D converter 204. In an embodiment, first stage 206 is configured to analyze at least one energy characteristic of the received audio signal to determine whether the received signal includes speech. For example, first stage 206 can be configured to compare one or more energy characteristics of the received audio signal to one or more respective thresholds. If the energy characteristics of the received audio signal meets or exceeds the one or more thresholds, first stage 206 outputs a first activation signal that activates second stage 208. In doing so, first stage 206 monitors the ambient environment to determine if a speech signal has been received.

In an embodiment, first stage 206 is constantly running. However, as described in greater detail below, a first stage 206 consumes a relatively small amount of power compared to the rest of voice activation system 200. Thus, the constant activity of first stage 206 does not result in a significant amount of power being wasted by voice activation system 200. Exemplary operation of first stage 206 is described further with respect to FIGS. 3 and 4.

Second stage 208 receives the first activation signal output by first stage 206. In an embodiment, second stage 208 can be a multi-state device. For example, second stage 208 can have at least two states. A first state of second stage 208 can be a stand-by state in which only the components in second stage 208 that are needed to recognize the first activation signal remain active. Once the first activation signal is received, second stage 208 can transition to a second state. For example, the second state can be a fully-operational state.

In the fully-operational state, second stage 208 can be configured to analyze at least one profile of the received audio signal to determine if "wake-up" words are present in the signal. Wake-up words are words that voice activation system 200 considers triggers that result in the entire speech recognition engine being activated. For example and without limitation, the words "on," "activate," and "wake-up" can be predetermined to be valid triggers for activation. For example, when second stage 208 is in the fully-powered state, second stage 208 can compare at least a portion of a profile of the received audio signal to one or more predefined profiles that represent wake-up words. If the received audio signal substantially matches the respective at least one predetermined profile, a second stage 208 can output a second activation signal. Exemplary operation of second stage 208 will be described in greater detail with respect to FIGS. 6-8.

Third stage 210 receives the second activation signal output by second stage 208. In an embodiment, third stage 210 includes a speech recognition engine. In a further embodiment, the speech recognition engine can be a multi-state device. For example, a first state of the speech recognition engine can be a stand-by state in which only the components needed to recognize the second activation signal remain active. Once the second activation signal is received, the speech recognition engine can be transitioned to a fully-operational state. In the fully-operational state, the speech recognition engine is able to recognize a full vocabulary of words within the received audio signal. Thus, in this embodiment, the second activation signal functions as the trigger that activates the speech recognition engine. However, it may be desired to provide greater accuracy in wake-up word recognition. For example, systems that will be included in environments prone to false negatives or false positives may benefit from more accurate wake-up word detection.

In an embodiment, the speech recognition engine instead transitions to a wake-up word detection state from the stand by state based on the second activation signal. In the wake-up word detection state, the speech recognition engine can be configured to specifically recognize wake-up words in the audio signal. In doing so, only those sets of acoustic, key word, and/or grammar models that are need to recognize wake-up words are loaded. Moreover, because fewer models are located, the recognizing function can be less power consuming because fewer comparisons between the received audio signal and the different models need to be conducted. Thus, the speech recognition engine can use less power in the wake-up word detection state than in the fully-operational state. In a further embodiment, the speech recognition engine can be configured to transition from the wake-up word detection state to either the stand-by state or the fully-operational state depending on whether wake-up words are recognized within the audio signal. Specifically, if wake-up words are determined to be present in the received audio signal, the speech recognition engine can be transitioned to the fully-operational state. If not, the speech recognition engine can be transitioned to the stand-by state. The operation of third stage 210 will be described in greater detail with respect to FIGS. 8 and 10.

Thus, in an embodiment, system 200 has three stages of which only first stage 206 is constantly running. Because first stage 206 is a relatively low power device compared to stages 208 and 210, system 200 can provide substantial power savings over conventional systems. For example, in an embodiment, out of the total power used by stages 206-210 in their respective fully-operational states, first stage 206 can use about five percent of the total power, second stage 208 can use about twenty percent, and third stage 210 can use about seventy-five percent. Thus, by ensuring that the most power consuming device, i.e., third stage 210, is active for the least amount of time, system 200 is able to provide significant power savings.

Figure 3:
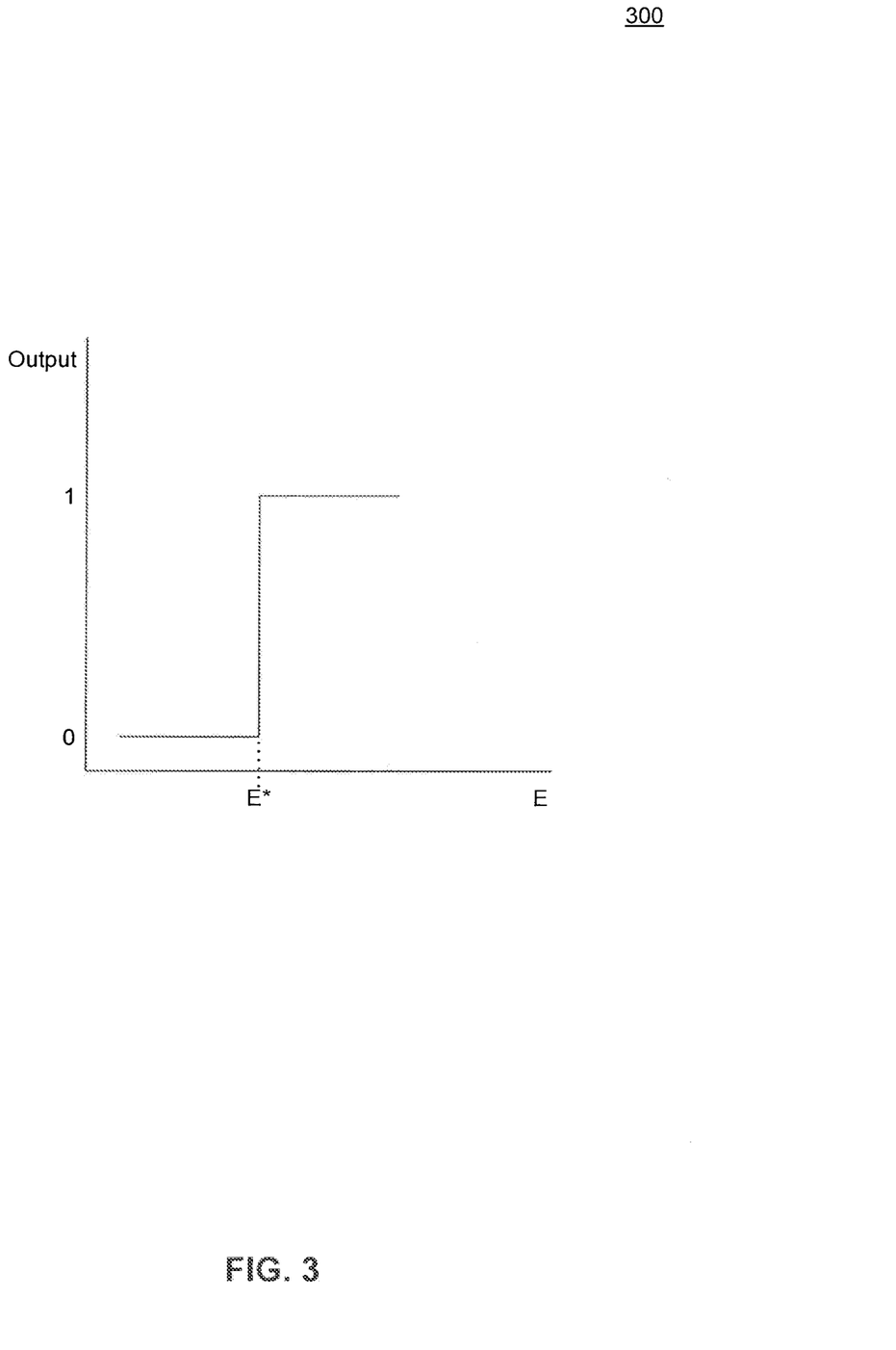
FIGS. 3 and 4 are plots illustrating exemplary operation of a first stage, according to embodiments of the present invention.

FIG. 3 shows a plot 300 illustrating an exemplary operation of a first stage, according to an embodiment of the present invention. As shown in the example embodiment of FIG. 3, the first stage can be an energy comparator that compares the energy level of the received audio signal to a predefined threshold. For example, as shown in FIG. 3, once the energy level of the received audio signal reaches E*, the output of the first stage switches from a logical 0 to a logical 1. In the embodiment of FIG. 3, an output of logical 1 can act as the first activation signal.

Figure 4:
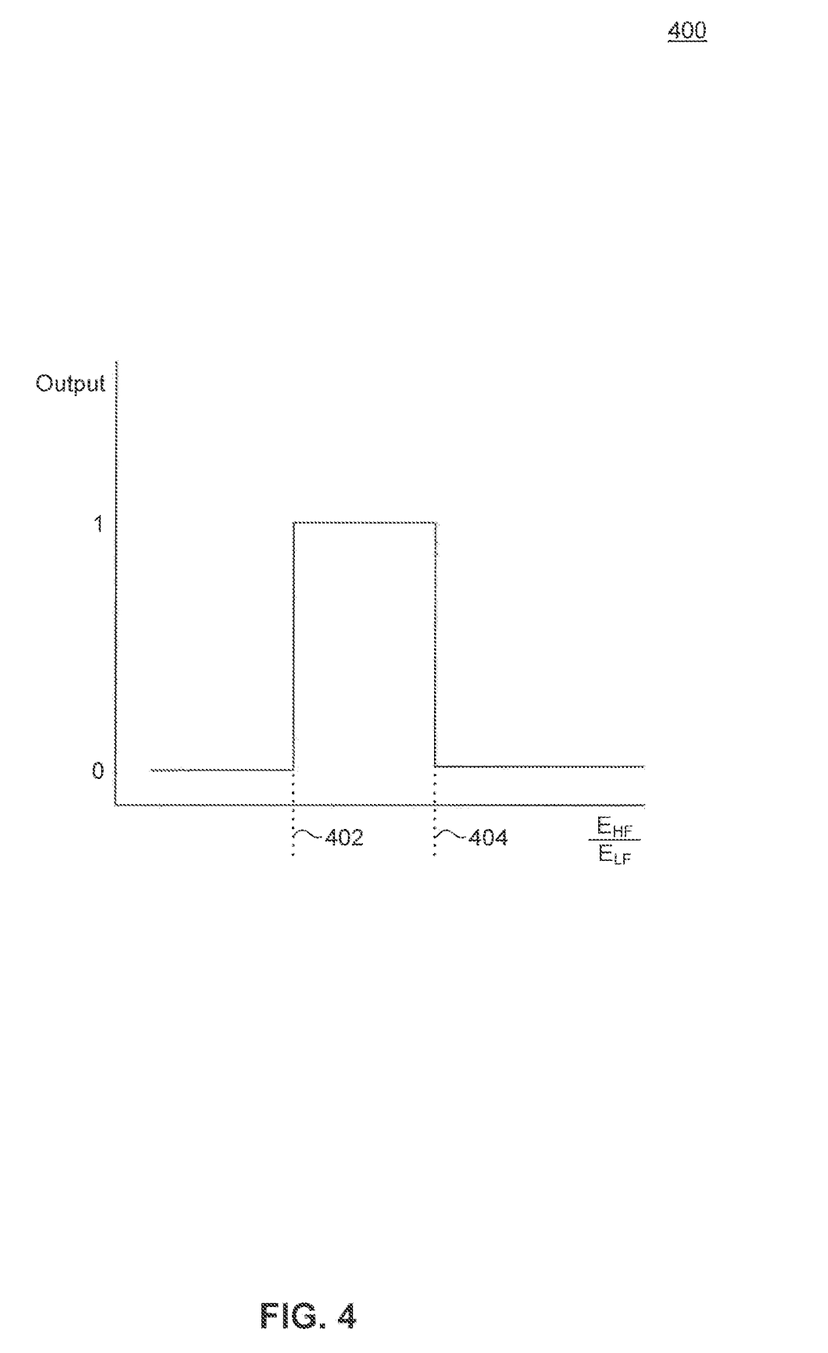

FIG. 4 shows a plot 400 illustrating another exemplary operation of a first stage, according to another embodiment of the present invention. In the embodiment depicted in FIG. 4, the first stage analyzes the ratio between high-frequency energy and low-frequency energy in the received audio signal. In a further embodiment, the first stage can store a pair of predefined thresholds 402 and 404. When the energy ratio is between thresholds 402 and 404, the first stage can output the first activation signal. The range between thresholds 402 and 404 can represent the energy ratios of common speech signals. Thus, when the energy ratio of the received audio signal falls outside of this range, first stage 206 can determine that the received audio signal is not speech signal, and therefore first stage 208 does not output the first activation signal. Thus, FIGS. 3 and 4 show different ways of triggering first stage 206 to output the first activation signal. In FIG. 3 the energy level acts as a trigger and in FIG. 4 the ratio of high frequency energy to low frequency energy acts as a trigger.

In another embodiment, the first stage can use a combination of the triggers illustrated in FIGS. 3 and 4. For example, a received audio signal may be required to satisfy the thresholds included in both FIGS. 3 and 4 for first stage 206 to generate the activation signal.

Figure 5:
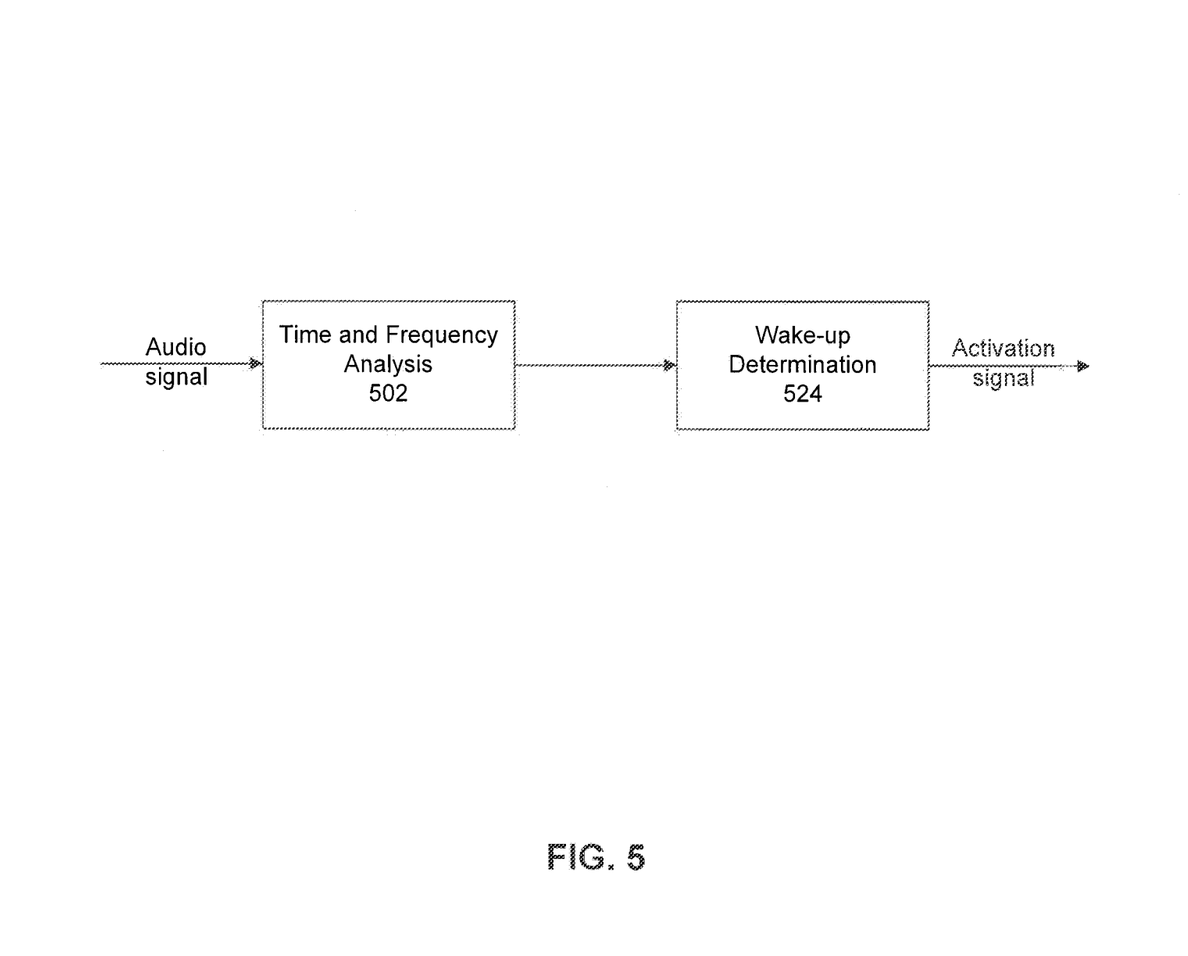
FIG. 5 is a block diagram of a second stage, according to an embodiment of the present invention.

FIG. 5 is an exemplary block diagram of a second stage 500, according to an embodiment of the present invention. Second stage 500 includes a time and/or frequency analysis module 502 and a wake-up determination module 504. In an embodiment, time and/or frequency analysis module 502 can compute a time domain and/or frequency domain profile of the received audio signal. For example, the time domain profile of the received audio signal can be represented as a plot of audio signal amplitude as a function of time. Moreover, time and/or frequency analysis module 502 can generate a frequency domain profile by computing a full time Fourier transform of the time domain profile.

Figure 6:
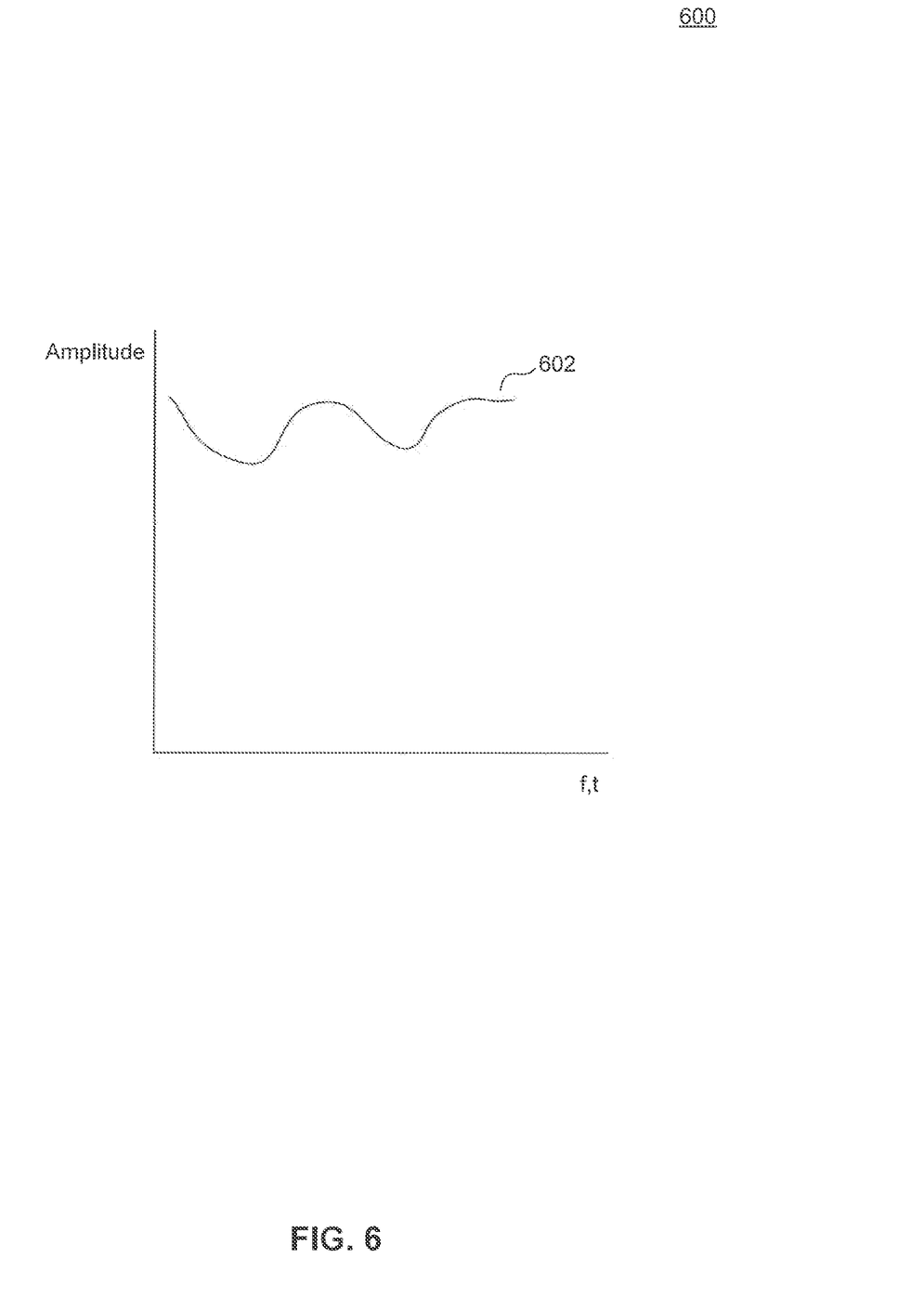
FIG. 6 shows an example plot illustrating an exemplary profile, according to an embodiment of the present invention.

FIG. 6 shows an example plot 600 illustrating an exemplary profile, according to an embodiment of the present invention. In the example of FIG. 6, time and/or frequency domain analysis module 502 can compute both time and frequency domain analysis of the received audio signal. Thus, plot 600 displays three variables: amplitude, frequency, and time. Time and/or frequency domain analysis module 502 outputs the computed profile to wake-up determination module 504.

Wake-up determination module 504 can compare the received profile to one or more predetermined profiles. In an embodiment, wake-up determination module 504 can determine, based on the comparison with the predetermined profiles, whether the received audio signal includes speech. In particular, by comparing the received profile to a profile that has been previously generated, wake-up determination module 504 can make a determination as to whether the received audio signal includes speech. The predetermined profiles can be generated based on modeling and/or experimental results regarding speech. Additionally, wake-up determination module 504 can also determine whether the audio signal includes one or more wake-up words. For example, wake-up determination module 504 can compare at least a portion of the received profile to profiles of known wake-up words. Wake-up determination module 504 outputs the second activation signal, e.g., a logical 1, if the audio signal includes voice or speech and/or one or more wake-up words.

Figure 7:
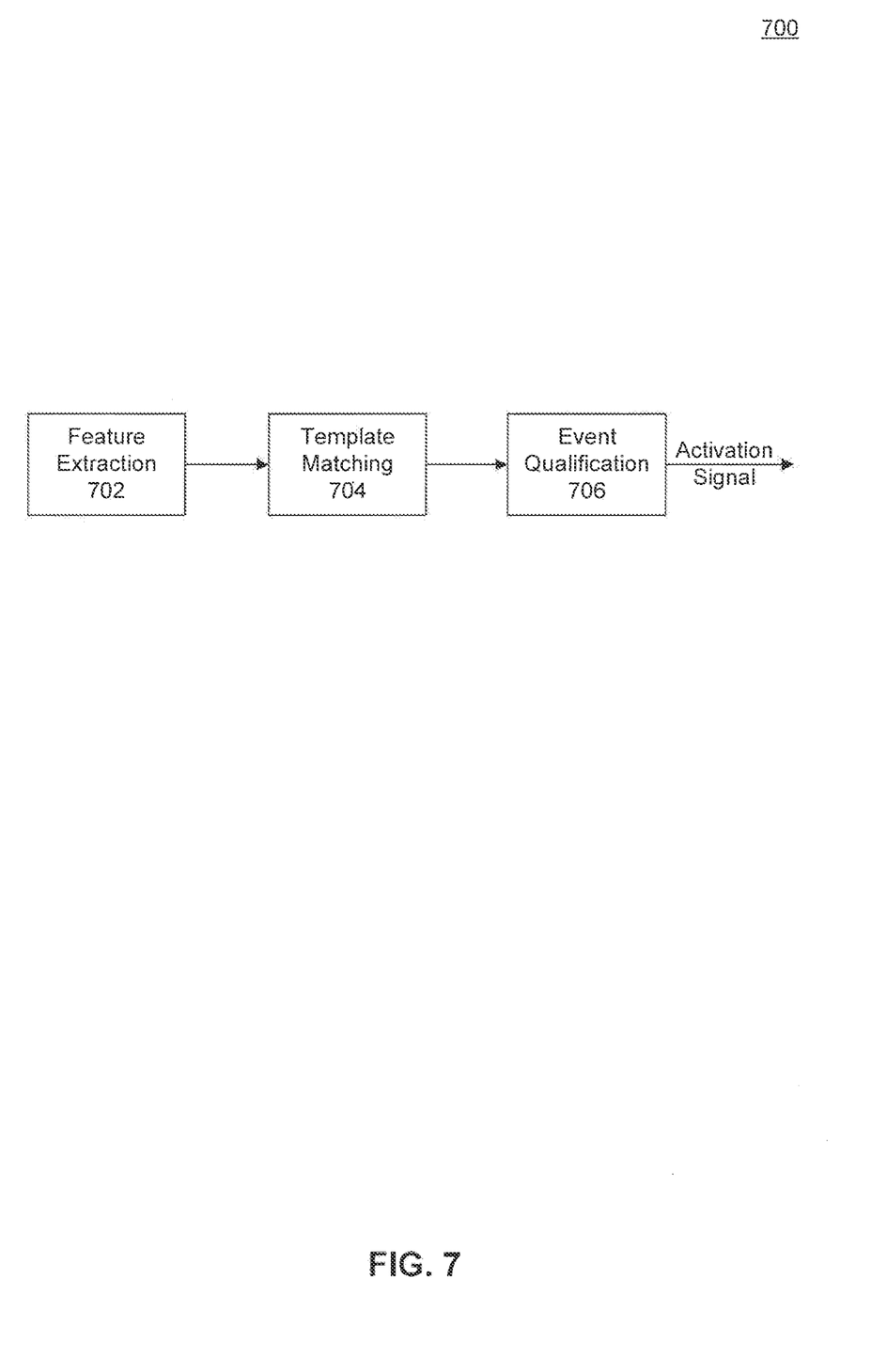
FIG. 7 is a block diagram of a second stage, according to an embodiment of the present invention.

FIG. 7 shows a block diagram of a second stage 700, according to another embodiment of the present invention. Second stage 702 includes a feature extraction module 702, a template matching model 704, and an event qualification module 706. Feature extraction module 702 is configured to represent the received audio signal in a frequency domain. For example, and without limitation, feature extraction module 702 can compute the mel-frequency cepstrum coefficients (MFCC) of the received audio signal. As a result of this process, feature extraction module 702 can determine MFCC that make up the MFC using these coefficients. These coefficients can then be output to template matching module 704. Template matching module 704 can match the received coefficients to one or more profiles that represent speech signals. For example, template matching module 704 can match the received coefficients to coefficients of known wake-up words.

In another embodiment, template matching module 704 can implement a Viterbi decoding scheme. By applying a Viterbi decoding scheme to the received audio signal, template matching module 704 can identify one or more wake-up words present in the audio signal. Template matching module 704 outputs the results of the template matching operations to event qualification module 706.

Based on the results received from template matching module 704, event qualification module 706 qualifies the received audio signal as including or not including one or more wake up words. If so, event qualification module 706 outputs the second activation signal to third stage 210.

Figure 8:
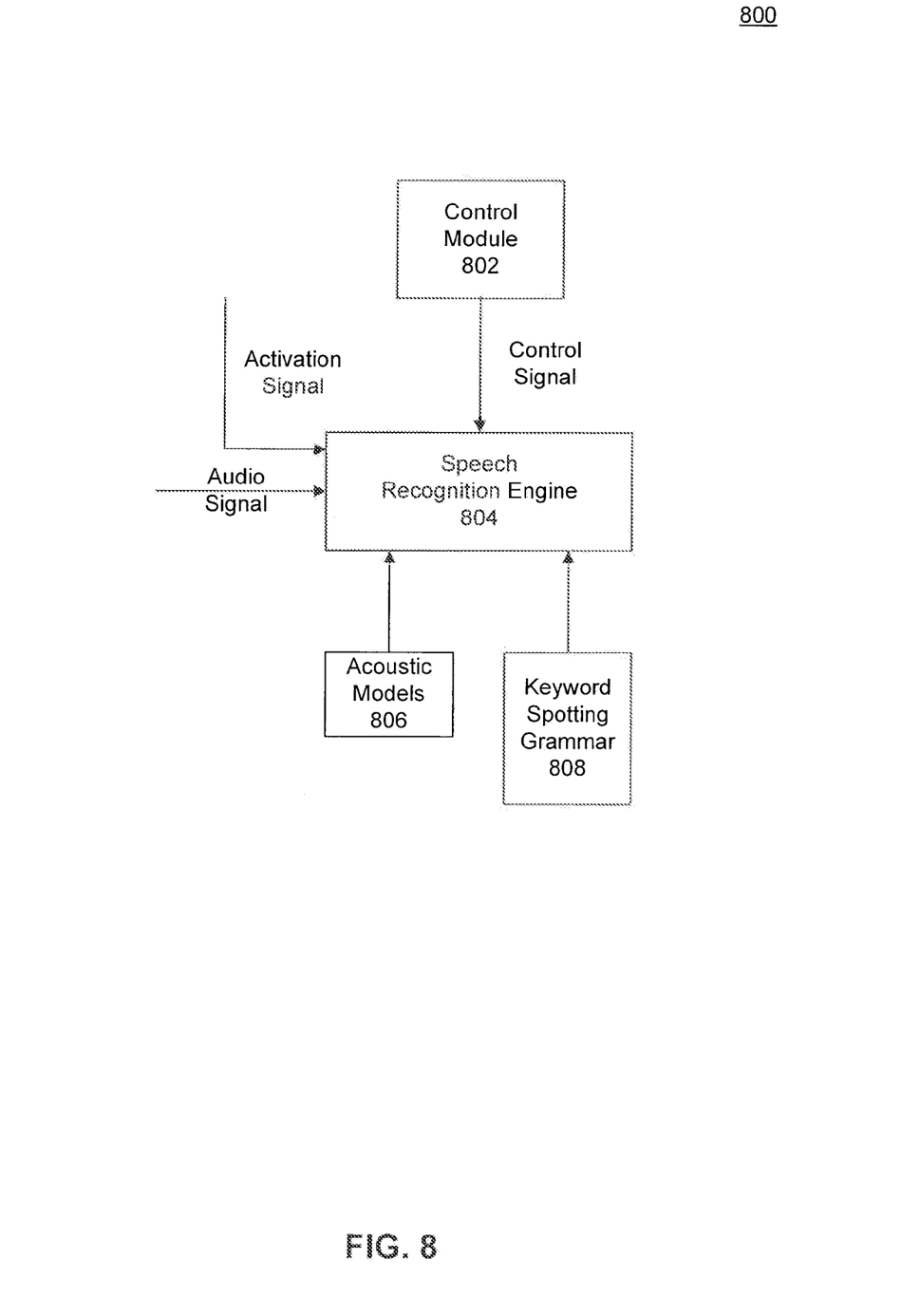
FIG. 8 is a block diagram of a third stage coupled to a control module, according to an embodiment of the present invention.

FIG. 8 shows a block diagram of a third stage 800 coupled to a control module 802, according to an embodiment of the present invention. Third stage 800 includes a speech recognition engine 804 which receives acoustic models 806 and keyword spotting grammar module 808. Speech recognition engine 804 is configured to recognize words included in the received audio signal. As described above, a speech recognition engine according to the description herein can be a multistate device. For example, in one embodiment, speech recognition engine 804 is able to operate according to three states: (1) stand-by state, (2) wake-up word detection state, and (3) fully operational state.

Figure 10:
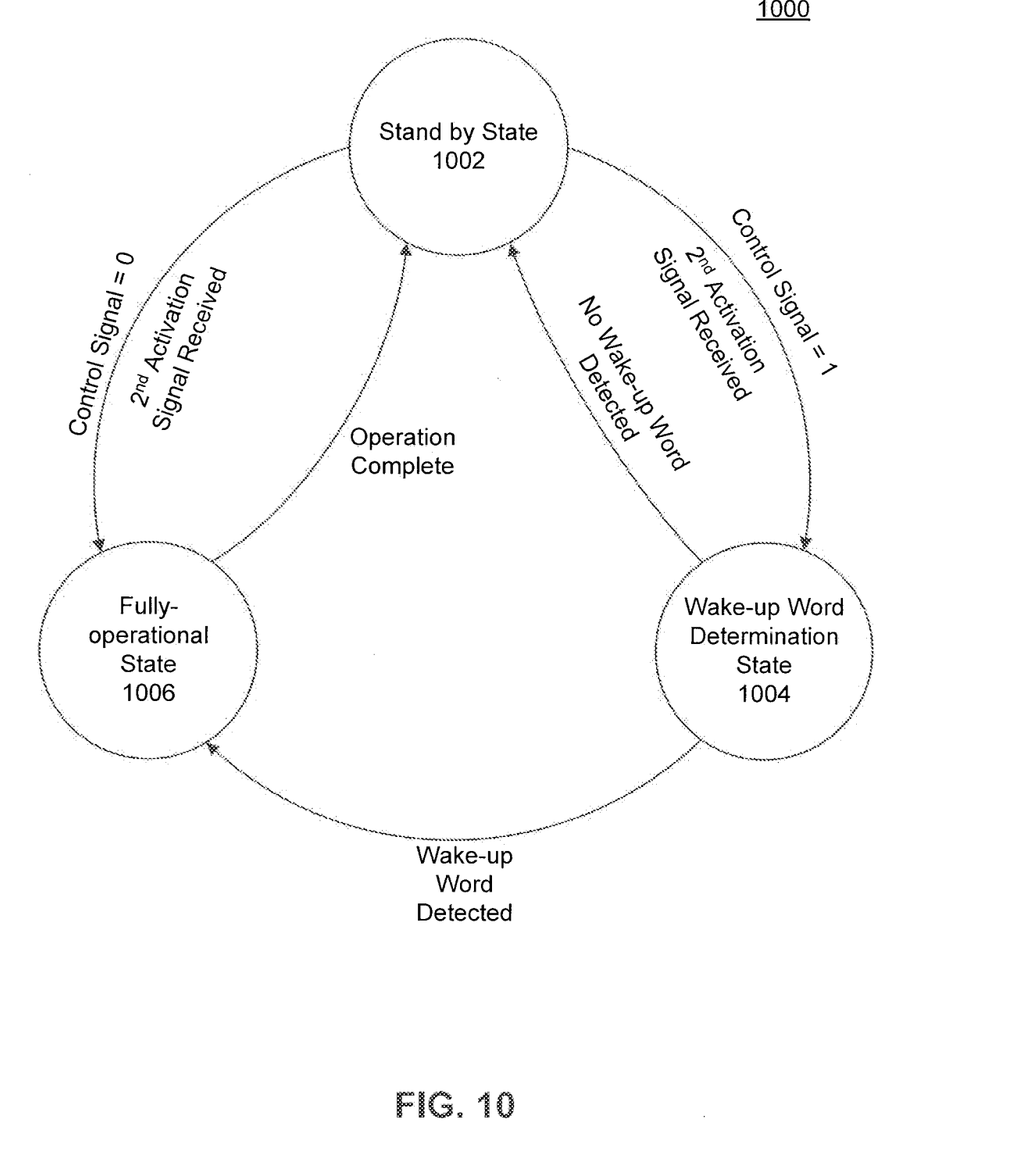
FIG. 10 shows a state diagram that illustrates the operation of a speech recognition engine, according to an embodiment of the present invention.

FIG. 10 shows a state diagram 1000 that illustrates the operation of speech recognition engine 804. In stand-by state 1002, speech recognition engine 804 only has sufficient components active that are needed to recognize the second activation signal. Thus, in the stand-by state, speech recognition engine 804 uses a minimal amount of power. Once the second activation signal is received from the second stage, speech recognition engine 804 can transition to either a wake-up word determination state 1004 or a fully operational state 1006 based on the control signal output by control module 802. In wake-up word determination state 1004, speech recognition engine 804 only loads those acoustic models 806 and key word spotting models 808 and performs only the comparisons needed to specifically recognize wake-up words. Having loaded those specific models, speech recognition engine 804 in wake-up word detection state 1004 can determine if one or more wake-up words are present within the received audio signal. If so, the speech recognition engine 804 can be transitioned to fully-operational state 1006 in which the speech recognition engine loads all acoustic models 806 and spotting full functional grammar module 808 to be able to recognize words in a full vocabulary. If not, speech recognition engine 804 transitions back to standby state 1002. In an embodiment, once speech recognition engine 804 enters fully operations state 1006, it remains in this state until a specified function is complete and/or a predetermined amount of time has passed.

Control module 802 is configured to output a control signal that enables speech recognition engine 804 to enter wake-up determination state 804. In an embodiment, control module 802 can determine whether to enable speech recognition engine 804 to enter wake-up word determination state 1004 based on a variety of factors. For example, control module 802 can output the control signal based at least in part on user input. In such an embodiment, a user can control, during operation, whether speech recognition engine 804 enters wake-up word detection state 1004.

Control module 802 is optional. In embodiments in which control module 802 is not included in third stage 800, the determination about whether speech recognition engine 804 is able to enter the wake-up word detection state can be determined at design time. For example, at design time, the types of conditions in which the device will be used can be generally determined. It can thus be predetermined whether enabling the wake-up word determination state would be appropriate. For example, certain devices may be designed to be used in noisy environments (e.g., toys designed to be used outdoors). Because these environments may be prone to false positives, it can be predetermined that the wake-up word detection should be enabled. On the other hand, if, for example, the device is designed to be used in a quiet environment, enabling the wake-up word detection state may not be appropriate.

Thus, in the embodiment of FIG. 8, the speech recognition engine 804 can serve two purposes. Speech recognition engine 804 can be used as an accurate check on whether an audio signal including wake-up words has in fact been received and can also be used to recognize a full vocabulary of words.

Figure 9:
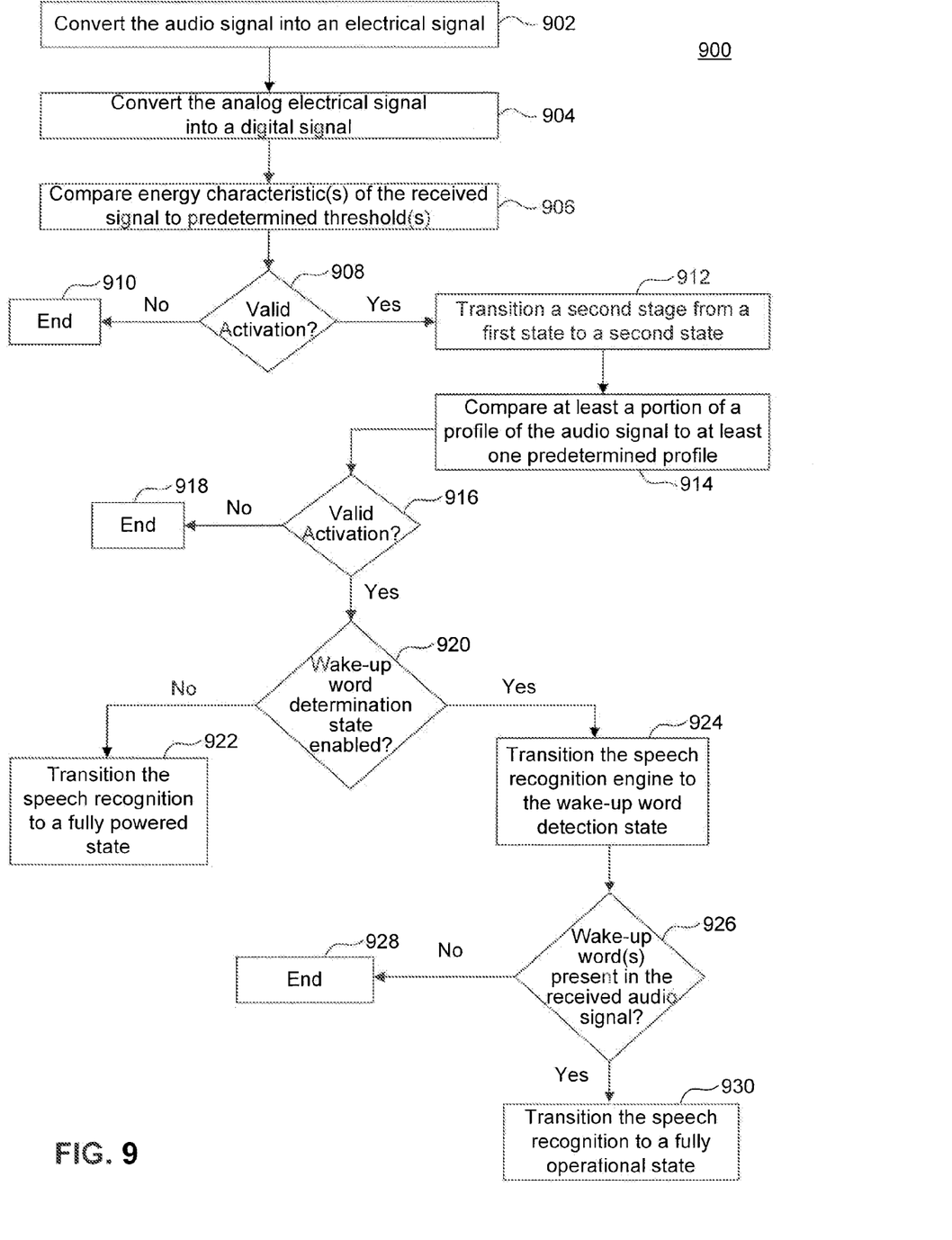
FIG. 9 shows a flowchart providing example steps for a voice activation method, according to an embodiment of the present invention.

FIG. 9 shows a flowchart 900 providing example steps for a voice activation method, according to an embodiment of the present invention. Other structural and operational embodiments will be apparent to persons skilled in the relevant art(s) based on the following discussion. The steps shown in FIG. 9 do not necessarily have to occur in the order shown. The steps of FIG. 9 are described in detail below.

In step 902, a received audio signal is converted into an electrical signal. For example, in FIG. 2, microphone 202 can convert the received sound waves into an electrical signal.

In step 904, the analog electrical signal is converted into a digital signal. For example, in FIG. 2, A/D converter 204 can convert the received analog electrical signal into a digital signal.

In step 906, one or more energy characteristics of the received signal can be compared to respective predetermined thresholds. For example, in FIG. 2, first stage 206 can compare one or more energy characteristics of the received audio signal to respective predetermined thresholds. For example, first stage 206 can analyze an energy level of the received audio signal and compare that energy level to a predetermined threshold, e.g., as shown in FIG. 3. Additionally or alternatively, first stage 206 can compare the high-frequency energy to low-frequency energy ratio of the received audio signal to one or more thresholds to determine whether the received audio signal is a voice signal, e.g., as shown in FIG. 4.

In step 908, it is determined whether the one or more energy characteristics of the received audio signal represent a valid activation. For example, first stage 206 can determine whether the received signal includes speech if its energy level exceeds a threshold and/or if its high frequency energy to low frequency energy ratio falls within a predetermined range. If a valid activation has been received, first stage 206 can output a first activation signal and flowchart 900 proceeds to step 912. If not, flowchart 900 ends at step 910.

In step 912, a second stage is transitioned from a first state to a second state. For example, in FIG. 2, second stage 208 can be transitioned from a stand-by state to an operational state responsive to the first activation signal output by first stage 206.

In step 914, at least a portion of a profile of the audio signal is compared to at least one predetermined profile. For example, in FIG. 2, second stage 208 can compare at least a portion of the received audio signal to at least one predetermined profile. For example, second stage 208 can compute a time domain and/or frequency domain profile of the received audio signal and compare it to a predetermined time and/or frequency domain profile. Additionally or alternatively, second stage 208 can extract MFCC from at least a portion of the audio signal and compare these coefficients to predetermined profile(s).

In step 916, it is determined whether the at least a portion of the profile of the audio signal results in a valid activation. For example, a valid activation may be the at least a portion of the profile matching the predetermined profile. If the at least a portion of the profile of the audio signal does not result in a valid activation, flowchart 900 ends at step 918. If on the other hand, a valid activation is determined, flowchart 900 advances to step 920.

In step 920, it is determined whether the wake-up word determination state for the speech recognition engine is enabled. If not, flowchart 900 advances to step 922, and the speech recognition engine is transitioned to a fully-powered state. If so, in step 924 the speech recognition engine is transitioned to the wake-up word detection state. For example, as described with reference to FIG. 8, control module 802 can enable speech recognition engine 804 to enter the wake-up word determination state by outputting the control signal to speech recognition engine 804.

In step 926, it is determined whether one or more wake-up words are present in the received audio signal. For example, in FIG. 8, speech recognition engine 804 can determine whether one or more wake-up words are present in the received audio signal. If not, flowchart 900 ends at step 928. If, on the other hand, one or more wake-up words are present in the received audio signal, flowchart 900 advances to step 930. In step 930, the speech recognition engine is transitioned to a fully-operational state. For example, in FIG. 8, if speech recognition engine 804 determines that one or more wake-up words are present in the received audio signal, speech recognition engine 804 can be transitioned to a fully-operational state in which speech recognition engine 804 can recognize a full vocabulary of words.

Figure 11:
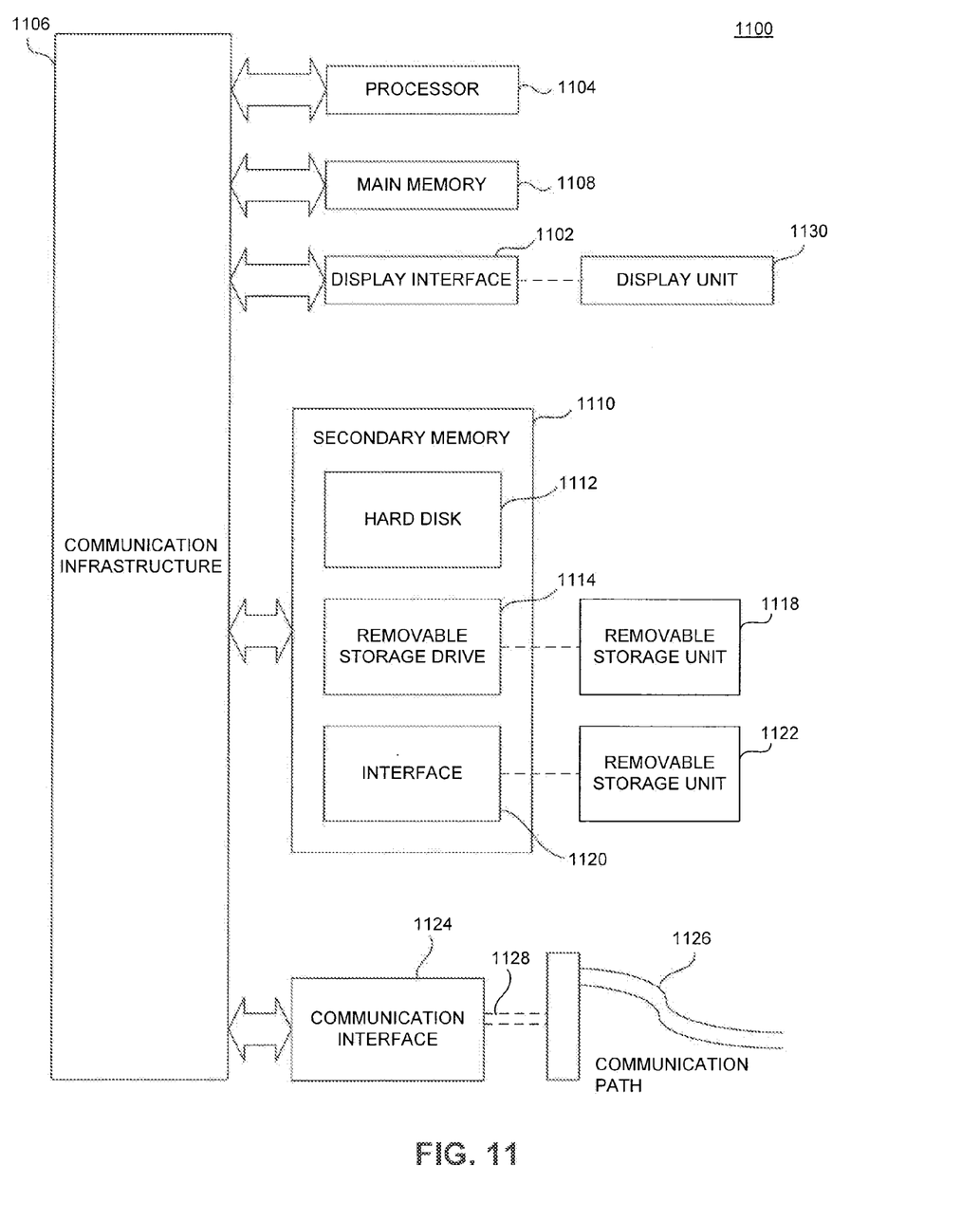
FIG. 11 illustrates an example computer system in which embodiments of a voice activation system, or portions thereof, may be implemented as computer-readable code.

FIG. 11 illustrates an example computer system 1100 in which embodiments of a system for providing an integrated mobile server application, or portions thereof, may be implemented as computer-readable code. For example, second stage 208 and/or third stage 210 may be implemented in computer system 1100 using hardware, software, firmware, tangible computer readable storage media having instructions stored thereon, or a combination thereof and may be implemented in one or more computer systems or other processing systems. Hardware, software, or any combination of such may embody any of the modules, procedures and components in FIGS. 2, 5, and 7-10.

If programmable logic is used, such logic may execute on a commercially available processing platform or a special purpose device. One of ordinary skill in the art may appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device.

For instance, a computing device having at least one processor device and a memory may be used to implement the above-described embodiments. A processor device may be a single processor, a plurality of processors, or combinations thereof. Processor devices may have one or more processor "cores."

Various embodiments of the invention are described in terms of this example computer system 1100. After reading this description, it will become apparent to a person skilled in the relevant art how to implement the invention using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

As will be appreciated by persons skilled in the relevant art, processor device 1104 may also be a single processor in a multi-core/multiprocessor system, such system operating alone, or in a cluster of computing devices operating in a cluster or server farm. Processor device 1104 is connected to a communication infrastructure 1106, for example, a bus, message queue, network, or multi-core message-passing scheme.

Computer system 1100 also includes a main memory 1108, for example, random access memory (RAM), and may also include a secondary memory 1110. Secondary memory 1110 may include, for example, a hard disk drive 1112, removable storage drive 1114. Removable storage drive 1114 may comprise a floppy disk drive, a magnetic tape drive, an optical disk drive, a flash memory, or the like. The removable storage drive 1114 reads from and/or writes to a removable storage unit 1118 in a well-known manner. Removable storage unit 1118 may comprise a floppy disk, magnetic tape, optical disk, etc. which is read by and written to by removable storage drive 1114. As will be appreciated by persons skilled in the relevant art, removable storage unit 1118 includes a computer usable storage medium having stored therein computer software and/or data.

Computer system 1100 (optionally) includes a display interface 1102 (which can include input and output devices such as keyboards, mice, etc.) that forwards graphics, text, and other data from communication infrastructure 1106 (or from a frame buffer not shown) for display on display unit 430.

In alternative implementations, secondary memory 1110 may include other similar means for allowing computer programs or other instructions to be loaded into computer system 1100. Such means may include, for example, a removable storage unit 1122 and an interface 1120. Examples of such means may include a program cartridge and cartridge interface (such as that found in video game devices), a removable memory chip (such as an EPROM, or PROM) and associated socket, and other removable storage units 1122 and interfaces 1120 which allow software and data to be transferred from the removable storage unit 1122 to computer system 1100.

Computer system 1100 may also include a communications interface 1124. Communications interface 1124 allows software and data to be transferred between computer system 1100 and external devices. Communications interface 1124 may include a modem, a network interface (such as an Ethernet card), a communications port, a PCMCIA slot and card, or the like. Software and data transferred via communications interface 1124 may be in the form of signals, which may be electronic, electromagnetic, optical, or other signals capable of being received by communications interface 1124. These signals may be provided to communications interface 1124 via a communications path 1126. Communications path 1126 carries signals and may be implemented using wire or cable, fiber optics, a phone line, a cellular phone link, an RF link or other communications channels.

In this document, the terms "computer program medium" and "computer usable medium" are used to generally refer to media such as removable storage unit 1118, removable storage unit 1122, and a hard disk installed in hard disk drive 1112. Computer program medium and computer usable medium may also refer to memories, such as main memory 1108 and secondary memory 1110, which may be memory semiconductors (e.g. DRAMs, etc.).

Computer programs (also called computer control logic) are stored in main memory 1108 and/or secondary memory 1110. Computer programs may also be received via communications interface 1124. Such computer programs, when executed, enable computer system 1100 to implement the present invention as discussed herein. In particular, the computer programs, when executed, enable processor device 1104 to implement the processes of the present invention, such as the stages in the method illustrated by the flowcharts in FIGS. 4 and 5. Accordingly, such computer programs represent controllers of the computer system 1100. Where the invention is implemented using software, the software may be stored in a computer program product and loaded into computer system 1100 using removable storage drive 1114, interface 1120, and hard disk drive 1112, or communications interface 1124.

Embodiments of the invention also may be directed to computer program products comprising software stored on any computer useable medium. Such software, when executed in one or more data processing device, causes a data processing device(s) to operate as described herein. Embodiments of the invention employ any computer useable or readable medium. Examples of computer useable mediums include, but are not limited to, primary storage devices (e.g., any type of random access memory), secondary storage devices (e.g., hard drives, floppy disks, CD ROMS, ZIP disks, tapes, magnetic storage devices, and optical storage devices, MEMS, nanotechnological storage device, etc.).

The present invention has been described above with the aid of functional building blocks illustrating the implementation of specified functions and relationships thereof The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

What is claimed is:

1. A voice activation system, comprising:
   a first module configured to receive an audio signal and output a first activation signal if at least one energy characteristic of the audio signal satisfies at least one threshold of one or more thresholds stored in a memory;
   a second module configured to transition from a first state to a second state in response to the first activation signal, compute one or both of a time and frequency profile of the audio signal when in the second state, and output a second activation signal if at least a portion of the computed time or frequency profile of the audio signal substantially matches at least one predetermined time or frequency profile indicative of speech in the audio signal; and
   a speech recognition engine coupled to the second module and configured to transition from a first state to a second state based on the second activation signal and if a wake-up word determination state is enabled, or transition from the first state to a third state based on the second activation signal and if the wake-up word determination state is disabled, wherein the speech recognition engine is configured to receive the audio signal and determine a speech content of the received audio signal;
   wherein the first module is configured to consume less power than the second module, wherein the second module is configured to consume less power than both the second and third states of the speech recognition engine, wherein the second state of the speech recognition engine is configured to consume less power than the third state of the speech recognition engine, and wherein the first module, second module, and speech recognition engine are implemented on one or more computing devices, and wherein the voice activation system includes the one or more computing devices.

2. The voice activation system of claim 1, wherein the second state of the speech recognition engine is a fully operational state.

3. The voice activation system of claim 1, wherein the second state of the speech recognition engine is a wake-up word detection state and wherein the speech recognition is configured to transition to the third state if the speech recognition engine recognizes at least one wake-up word in the audio signal, wherein the third state is a fully operational state.

4. The voice activation system of claim 3, wherein the speech recognition engine is configured to transition to the first state if the speech recognition engine does not recognize the at least one wake-up word in the audio signal.

5. The voice activation system of claim 3, further comprising:
   a control module configured to enable the speech recognition engine to transition to the wake-up word detection state.

6. The voice activation system of claim 5, wherein the control module is configured to enable the speech recognition engine to transition to the wake-up word detection state based on at least input from a user.

7. The voice activation system of claim 1, wherein the first module is configured to compare an energy level of the audio signal to a threshold of the one or more thresholds.

8. The voice activation system of claim 1, wherein the first module is configured to compare a ratio of high frequency energy to low frequency energy in the audio signal to a threshold of the one or more thresholds.

9. A voice activation method, comprising:
  comparing at least one energy characteristic of an audio signal to at least one threshold of one more thresholds using a first module of a voice activation system;
  transitioning a second module of the voice activation system from a first state to a second state if the audio signal satisfies the threshold;
  computing one or both of a time and frequency profile of the audio signal in the second state;
comparing at least a portion of one or both of the computed time and frequency profiles of the audio signal to at least one predetermined time or frequency profile indicative of speech in an audio signal using the second module of the voice activation system while the second module of the voice activation system is in the second state; and
  transitioning a speech recognition engine of the voice activation system from a first state to a second state if the least a portion of a profile of the audio signal substantially matches the at least one predetermined profile and if a wake-up word determination state is enabled, or transitioning the speech recognition engine from the first state to a third state if the portion of the profile of the audio signal substantially matches the at least one predetermined profile and if the wake-up word determination state is disabled, wherein the second state of the second module consumes less power than the second state of the speech recognition engine, and wherein the second state of the speech recognition engine consumes less power than the third state of the speech recognition engine.

10. The method of claim 9, wherein the second state of the speech recognition engine is a fully operational state.

11. The method of claim 9, wherein the second state of the speech recognition engine is a wake-up word detection state, the method further comprising:
  determining whether at least one wake-up word is present in the audio signal using the speech recognition engine while the speech recognition engine is in the wake-up word detection state; and
  transitioning the speech recognition engine from the wake-up word detection state to the third state if the at least one wake-up word is present in the audio signal, wherein the third state is a fully operational state of the speech recognition engine.

12. The method of claim 11, further comprising:
  enabling the speech recognition engine to transition to the wake-up word detection state.

13. The method of claim 9, wherein comparing at least one energy characteristic of an audio signal comprises:
  comparing an energy level of the audio signal to a threshold of the one or more thresholds.

14. The method of claim 9, wherein comparing at least one energy characteristic of an audio signal comprises:
  comparing a ratio of high frequency energy to low frequency energy in the audio signal to a threshold of the one or more thresholds.

15. The method of claim 9, wherein comparing at least a portion of a profile of the audio signal comprises:
  extracting a feature of the audio signal; and
  comparing the feature to the at least one predetermined profile.

16. A voice activation system, comprising:
  a microphone configured to output an analog electrical signal corresponding to received sound waves;
  an analog-to-digital converter configured to covert the analog electrical signal to a digital signal;
  a first module configured to output a first activation signal if at least one energy characteristic of the digital signal satisfies at least one threshold;
  a second module configured to transition from a stand-by state to a fully-operational state in response to the first activation signal, compute one or both of a time and frequency profile of the digital signal when in the fully-operational state, and output a second activation signal if at least a portion of the computed time or frequency profile of the digital signal substantially matches at least one predetermined time or frequency profile indicative of speech in an audio signal; and
  a speech recognition engine configured to transition from a first state to a second state based on the second activation signal and if a wake-up word determination state is enabled, or transition from the first state to a third state based on the second activation signal and if the wake-up word determination state is disabled, wherein the speech recognition engine is configured to receive the digital signal and determine a speech content of the received sound waves; and
  wherein the first module is configured to consume less power than the second module, wherein the second module is configured to consume less power than both the second and third states of the speech recognition engine, wherein the second state of the speech recognition engine is configured to consume less power than the third state of the speech recognition engine, and wherein the first module, second module, and speech recognition engine are implemented on one or more computing devices, and wherein the voice activation system includes the one or more computing devices.

* * * * *